US009632188B2

(12) United States Patent
Chandrasekharan et al.

(10) Patent No.: US 9,632,188 B2
(45) Date of Patent: Apr. 25, 2017

(54) NOBLE GAS DETECTOR FOR FISSILE CONTENT DETERMINATION

(75) Inventors: Rico S. Chandrasekharan, Zurich (CH); Michael V. Hynes, Cambridge, MA (US); Donald D. Flechtner, Maynard, MA (US)

(73) Assignees: RAYTHEON COMPANY, Waltham, MA (US); ARKTIS RADIATION DETECTORS LTD., Zurich (CH)

( * ) Notice: Subject to any disclaimer, the term of this patent is extended or adjusted under 35 U.S.C. 154(b) by 1249 days.

(21) Appl. No.: 13/196,772

(22) Filed: Aug. 2, 2011

(65) Prior Publication Data

US 2013/0034198 A1    Feb. 7, 2013

(51) Int. Cl.
*G01T 3/00* (2006.01)
*G01V 5/00* (2006.01)

(52) U.S. Cl.
CPC ............ *G01T 3/001* (2013.01); *G01V 5/0091* (2013.01)

(58) Field of Classification Search
CPC .... G01T 1/00; G01T 3/00; G01T 7/00; G01T 1/003; G01T 1/20; G01T 1/2006;
(Continued)

(56) References Cited

U.S. PATENT DOCUMENTS 2,443,731 A    6/1948 Herzog et al.
2,741,705 A    4/1956 McKay
(Continued)

FOREIGN PATENT DOCUMENTS

EP          677754  A1 * 10/1995    ............... G01V 5/10
EP    1 847 855  A1    10/2007
(Continued)

OTHER PUBLICATIONS

Miller, et al., "Contraband Identification in Sealed Containers Using Neutron Transmission", downloaded from SPIE Digital Library, http://spiedi.org/terms, XP-002628469, Mar. 17, 2011 (pp. 215-218).

(Continued)

*Primary Examiner* — Jack W Keith
*Assistant Examiner* — Sharon M Davis
(74) *Attorney, Agent, or Firm* — Lewis Roca Rothgerber Christie LLP

(57) ABSTRACT

A method and a system for fissile content measurement that utilizes a detector configured to detect fast neutrons. An external radiation source may be used to induce fission in a sample to allow the measurement of a fissile material of the sample with a low spontaneous fission probability. Analyzing the sample may be based on the energy spectrum of emitted neutrons. That is, the energy information regarding the energy of the fast neutrons is obtained, and the fast neutrons as having a high likelihood of originating in a nuclear fission process as opposed to originating in an (alpha,n) reaction by utilizing the obtained energy information are classified to analyze the sample. Alternatively, a position of interaction in the detector of neutron emitted by the sample is measured, and this position is retraced back through intervening material(s) between the detector and the sample to determine the spacial geometry of the sample.

5 Claims, 14 Drawing Sheets

(58) Field of Classification Search
CPC .... G01T 1/205; G01T 3/001; G01T 3/06; G01T 3/065; G01V 5/0091; G01V 5/107; G01N 23/2073; G21C 7/00; G21F 5/04; Y02E 10/00
USPC ....... 376/153, 154, 159; 250/370.03, 390.01, 250/505.1; 377/10, 19; 702/8
See application file for complete search history.

(56) References Cited

U.S. PATENT DOCUMENTS

| | | | |
|---|---|---|---|
| 2,759,107 A * | 8/1956 | Armistead et al. | 250/369 |
| 2,769,094 A * | 10/1956 | Linlor | G01T 3/00 250/390.08 |
| 2,830,185 A | 4/1958 | Scherbatskoy | |
| 2,842,695 A | 7/1958 | Goodman | |
| 2,920,204 A | 1/1960 | Youmans | |
| 3,222,521 A | 12/1965 | Einfeld | |
| 3,411,109 A * | 11/1968 | Forman | 331/126 |
| 3,456,113 A | 7/1969 | Keepin | |
| 4,201,912 A | 5/1980 | Evans et al. | |
| 4,483,816 A | 11/1984 | Caldwell et al. | |
| 4,617,466 A | 10/1986 | Menlove et al. | |
| 4,920,271 A | 4/1990 | Arnone | |
| 5,197,130 A | 3/1993 | Chen et al. | |
| 5,638,420 A * | 6/1997 | Armistead | B66C 19/007 378/146 |
| 6,341,150 B1 | 1/2002 | Ivanov et al. | |
| 6,420,712 B1 | 7/2002 | Menlove et al. | |
| 6,509,563 B1 | 1/2003 | McElroy, Jr. et al. | |
| 7,375,342 B1 * | 5/2008 | Wedding | 250/385.1 |
| 7,773,656 B1 * | 8/2010 | Mills | 372/55 |
| 8,384,004 B1 * | 2/2013 | Rowland | G01T 3/00 250/207 |
| 2005/0094758 A1 * | 5/2005 | Ronaldson et al. | 376/153 |
| 2007/0001123 A1 | 1/2007 | Andrews et al. | |
| 2009/0074128 A1 | 3/2009 | Bertozzi et al. | |
| 2009/0294686 A1 | 12/2009 | Chandrasekharan | |
| 2010/0327170 A1 | 12/2010 | Ivan et al. | |

FOREIGN PATENT DOCUMENTS

| | | | |
|---|---|---|---|
| EP | 1847855 A1 * | 10/2007 | G01V 5/10 |
| WO | WO 2011/032569 A1 | 3/2011 | |

OTHER PUBLICATIONS

Eberhardt, et al., "Fast Neutron Radiography Scanner for the Detection of Contraband in Air Cargo Containers", Applied Radiation and Isotopes 63, 2005 (pp. 179-188).

Partial International Search accompanying Invitation to Pay Additional Fees for International Application No. PCT/US2011/046974, filed Aug. 8, 2011, Partial International Search Report mailed Sep. 7, 2012 (11 pgs.).

International Preliminary Report on Patentability from Corresponding International Application No. PCT/US2011/046974,filed Aug. 8, 2011, Applicant—Raytheon Company, IPRP dated Feb. 4, 2014 and mailed Feb. 13, 2014 (18 pgs.).

Written Opinion of the International Searching Authority for International Application No. PCT/US2011/046974, filed Aug. 8, 2011, Written Opinion of the International Searching Authority dated Aug. 31, 2012 and mailed Nov. 8, 2012 (16 pgs.).

International Search Report for International Application No. PCT/US2011/046974, filed Aug. 8, 2011, International Search Report dated Aug. 31, 2012 and mailed Nov. 8, 2012 (6 pgs.).

* cited by examiner

NOBLE GAS DETECTOR FOR FISSILE CONTENT DETERMINATION

BACKGROUND

1. Field

The following description relates to systems and methods utilizing a measure of neutron energy as a filter to determine the Plutonium and/or fissile material content of nuclear material such as mixed-oxide (MOX) reactor rods.

2. Description of Related Art

The detection of neutrons as a probe of material structure and composition has been in use over many decades. Using charged radioactive particles as probes is straightforward as they leave a path of disruption in the material through which they pass which disruption can be measured with ease. The challenge in detecting neutrons is that they are neutral particles resulting in no path of disruption. Detection of neutrons requires that the neutron interact with the nucleus of an atom in the material which it is transiting. The usual result of such an interaction is the emission or recoil of a charged radioactive particle which is subsequently detected. The likelihood of such an interaction can vary by many orders of magnitude depending on the material involved.

Most commonly the material used for these detections is an isotope of Helium, He-3, which has a relatively large likelihood of an interaction with neutrons of very low energies often referred to as thermal neutrons. The capture of the thermal neutron on He-3 results in the emission of a tritium nucleus and a proton both of which can be easily detected. The He-3 is used as a fill gas for a proportional counter which detects the resulting emissions of thermal neutron capture.

Other materials in use for neutron detection are based on the large likelihood of a thermal neutron interaction with an isotope of Boron, B-10. Detectors of this type are filled with boron-trifluoride gas (BF3), or have walls of the proportional counter coated with B-10. U.S. Pat. No. 2,443,731 (which is incorporated herein in its entirety by reference) provides an early citation of these approaches.

All these detectors measure only thermal neutrons. However, many applications result in neutrons of high energy, sometimes referred to as fast neutrons. To be detected by these detectors requires that the energy of these fast neutrons be lowered or thermalized using elastic collisions in hydrogenous materials such as polyethylene.

There is a natural background of neutrons resulting from cosmic ray interactions in the atmosphere and other sources. To be detectable the flux of neutrons coming from the source of interest must be generally equal to or greater than this background. Other measurement methods, such as coincidence measurements, can also make the neutrons of interest more detectable. In coincidence measurements two or more neutrons are emitted simultaneously by the object of interest. These neutrons are detected together within a very short interval.

A unique feature of the fissile radioactive material, notably Plutonium (Pu), is that when it spontaneously fissions it emits several neutrons at the same time. The energy spectrum of these emitted neutrons is often referred to as a Watt spectrum named after B. E. Watt, a Los Alamos scientist who measured the spectrum for the first time in 1952. In addition to the natural background there are other reactions such as the alpha particle interactions with Oxygen which can produce neutrons sometimes referred to as (alpha,n) reactions. This source of neutrons can be significant as alpha particles are very commonly emitted by fissile materials. When these fissile materials are embedded in an Oxygen compound such as in a MOX material, neutrons from (alpha,n) reactions can be very likely. Discriminating between Watt spectrum neutrons and (alpha,n) neutrons can provide a measurement of the matrix in which the fissile material is embedded. However, these neutrons are emitted singly and not in simultaneous multiples. This allows for the use of coincidence measurement to determine the presence of Pu isotopes and other fissile materials in reactor rods. U.S. Pat. No. 3,222,521 (which is incorporated herein in its entirety by reference) is an early patent citation using this multiplicity approach to determine the fissile content of reactor rods.

In addition to the background neutrons and the neutrons not of direct relevance to the presence of fissile material, there is a significant flux of gamma rays coming from natural sources and from the radioactive materials of interest and the matrix in which they are embedded. To be usefully used in these applications, neutron detectors need to not only be capable of detecting neutrons but also be relatively insensitive to gamma rays or have a method by which the gamma ray and neutron signals can be separated electronically. The He-3, BF3, and B-10 based detectors are very insensitive to gamma rays, and are incapable of delivering energy information.

To accomplish the coincidence measurements requires electronic circuitry that can measure that a signal coming from one of the detectors is above a set or predetermined amplitude and the time of the detection of the signal. There is also needed a program on a computer for analyzing the data or more generally a filter that requires two or more signals be detected with an amplitude sufficient to be indicative of a neutron and that these signals be detected within a narrow time interval. U.S. Pat. No. 3,456,113 (which is incorporated herein in its entirety by reference) is an early patent citation describing this type of circuitry and analysis system.

The above discussed measurement approaches have been further and extensively discussed in many other basic research literatures and in U.S. Pat. Nos. 2,741,705; 2,842,695; 2,920,204; 2,830,185; 4,201,912; 4,483,816; 4,617,466; 4,920,271; 5,197,130; 6,341,150; 6,420,712; and 6,509,563; the entire contents of all of which are incorporated herein by reference.

The above information disclosed in this Background section is only for enhancement of understanding of the background of the invention and therefore may contain information that does not form the prior art that is already known to a person of ordinary skill in the art.

SUMMARY

Aspects of embodiments of the present invention are directed toward a device, a method, and a system for fissile content measurement utilizing a detector that does not require He-3 (which is becoming extremely rare and difficult to obtain), is substantially insensitive to gammas, and does not require a coincidence measurement.

An embodiment of the present invention provides a device which detects and measures the energy of a neutron emitted by an object and its position of interaction along the tubular structure of the detector. This detection and measurement utilizes a unique eximer excitation of the He-4 gas contained in this tubular structure.

An embodiment of the present invention provides a device which detects and measures the energy of a neutron emitted by an object and its position of interaction along the tubular structure of the detector. This detection and measurement utilizes a unique eximer excitation of other noble gases contained in this tubular structure.

An embodiment of the present invention provides a method for analyzing a sample based on the energy spectrum of emitted neutrons. The method includes the steps of: detecting fast neutrons emitted by a sample; obtaining energy information regarding the energy of the detected fast neutrons; and classifying the detected fast neutrons as having a high likelihood of originating in a nuclear fission process as opposed to originating in an (alpha,n) reaction by utilizing the obtained energy information. For example, fast neutrons are classified as having a high likelihood of originating in a nuclear fission process as opposed to originating in an (alpha,n) reaction when their energy is within certain energy windows as explained below.

An embodiment of the present invention provides a method of classification of the detected fast neutrons as having a high likelihood of originating in a nuclear fission process as opposed to originating in an (alpha,n) reaction by utilizing the obtained energy information with one or more energy thresholds or windows set in accordance with the energy cutoffs of the (alpha,n) spectra, as opposed to the Watt spectrum.

An embodiment of the present invention provides a method of determining the source of origin of an emitted neutron by utilizing the position sensitivity of the detector. Because the detector provides for a measure of where the emitted neutron interacted in the tubular structure, that information can be used to trace back to the point of origin of the neutron. To accomplish this trace a collimator between the neutron emitting object and the detector may be required.

An embodiment of the present invention provides for a system for measuring and analyzing the energy spectrum of neutrons coming from an emitting object. This system includes the detector, the data acquisition electronics (DAQ), the data analysis electronics (DAS), and the data visualization electronics (DVS).

An embodiment of the present invention provides for a system for measuring and analyzing the neutron source of origin of an emitting object. This system includes the detector, the data acquisition electronics (DAQ), the data analysis electronics (DAS), and the data visualization electronics (DVS).

Here, in one embodiment, the DAQ, the DAS, and the DVS may a part of a data acquisition (DAQ) Processor or an application-specific integrated circuit (ASIC) processor, or both

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
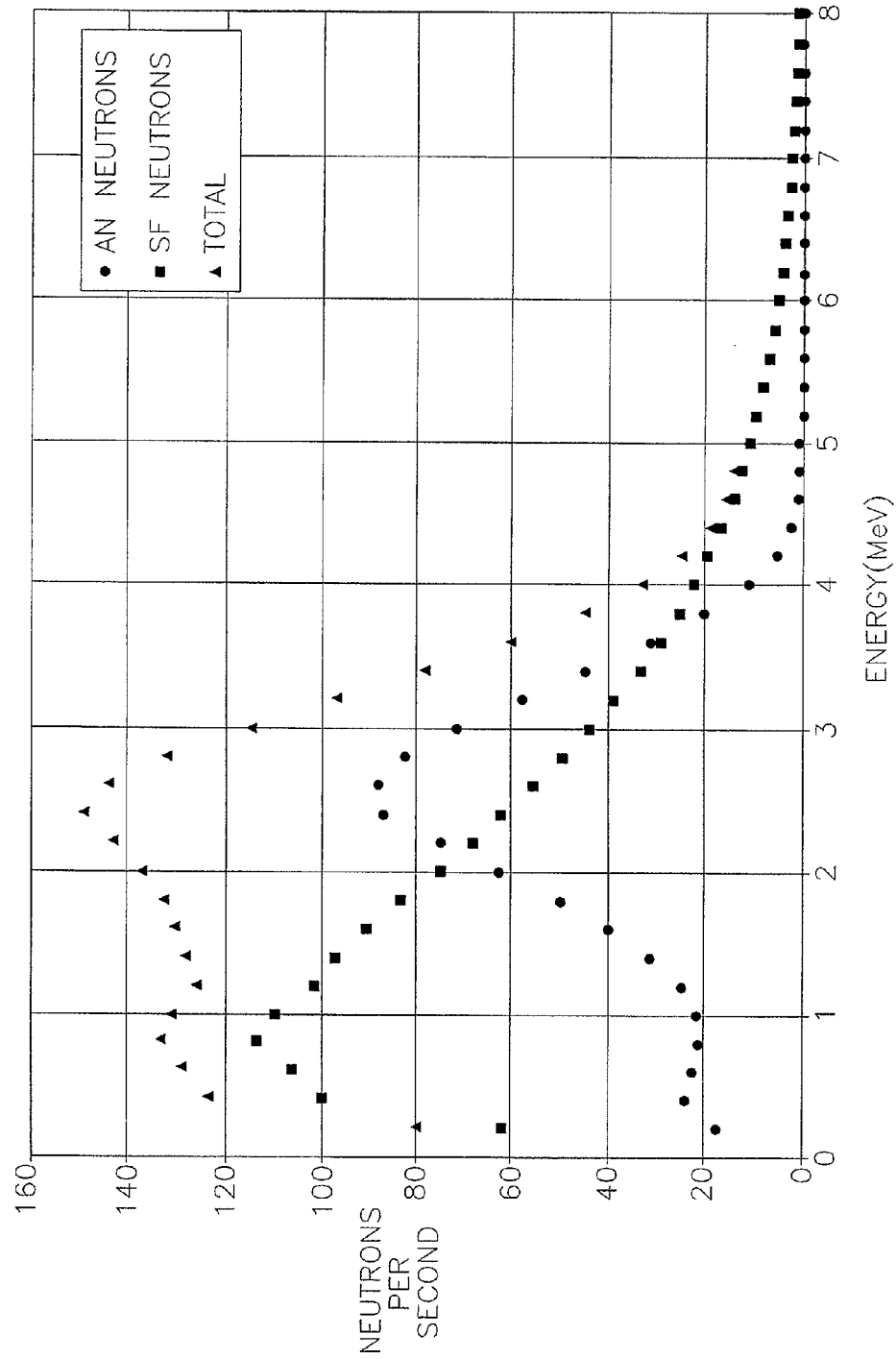
FIG. 1 shows computer simulation results of an energy spectrum of neutrons coming from a representative composition of mixed Oxide (MOX) reactor fuel. The various contributing sources are shown; (alpha,n) sources indicated as AN NEUTRONS and spontaneous fission neutrons also known as the Watt spectrum neutrons and indicated as SF NEUTRONS. A total for all sources is also shown.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

MOX nuclear fuel rods for both pressurized water reactors (PWR) and boiling water reactors (BWR) require screening for Plutonium and/or total fissile content and relative isotopic abundances for safeguards and reactor performance verification. One form of detection system employs He-3 tubes as thermal neutron detectors. However, the supply of the He-3 isotope is becoming scarce. This has caused He-3 to be unavailable or prohibitively expensive for many nuclear fuel characterization applications. Embodiments of the present invention provide alternative detector(s) and alternative method(s) to measure the total Plutonium content and/or total fissile content.

An embodiment of the invention provides a detector that utilized an isotope of Helium, He-4, to measure fast neutrons. Here, from the fast neutron measurements, the fissile content (e.g., Pu content) and relative isotopic abundances can be determined.

More specifically, an embodiment of the present invention utilizes an isotope of Helium, He-4, in the form of a high pressure (200 bar) gas, which is very easily obtained. An incoming neutron collides with a He-4 nucleus which recoils through the surrounding gas producing eximer excited states of molecular He-4 whose decays to the ground state emit light that can be detected by photomultiplier tubes (PMTs) which are at the ends of the tubular detector, as for example disclosed in United States Patent Publication No. 2009/0294686, which is incorporated herein in its entirety by reference. The amount of light produced by this eximer process is proportional to the kinetic energy of the incident neutron. When the emitted light is detected by the PMTs, the amplitude of the signal coming from the PMTs is a measure of the energy of the incident neutron.

Referring to FIG. 1, a unique feature of the energy spectrum of the neutrons coming from (mixed Oxide) MOX reactor rods is that above a certain energy, the dominant source of those neutrons is from Pu-240, an isotope of critical importance in many applications. By using the energy measurement capability of the detector according to an embodiment of the present invention and applying an energy threshold not allowing neutrons with kinetic energies below the certain threshold to be recorded, the measure of effective Pu-240 content without the need for coincidence circuitry is realized. The effective Pu-240 content of MOX reactor rods is emblematic of the total Pu content of these rods arising from all isotopes of Pu. The effective Pu-240 mass is commonly defined by a relationship similar to $m'_{240} = 2.54\ m_{238} + 1.0\ m_{240} + 1.69\ m_{242}$. The Pu-240 content and the derived total Plutonium content is of critical importance to international safeguards and reactor operations.

As envisioned, a detection system according to an embodiment of the present invention is based upon the use of noble gas, e.g. He-4, filled tubes as described in more detail below with reference to FIG. 2, but alternate configurations of noble gas, e.g. He-4, filled detectors may be equally applicable or even preferred, and the present invention should not be thereby limited. Unlike He-3, where a moderator is required to slow the neutrons to detectable thermal energies, the positioning, time of flight and energy information is preserved by these noble gas, e.g. He-4, detectors. Neutrons due to both (alpha,n) reactions and spontaneous fission (SF) events are emitted from MOX fuel rods.

It has been determined that neutrons emitted with a kinetic energy above 6 MeV are due to SF events of the fissile material. An embodiment of the present invention has sufficient energy resolution to establish a predetermined threshold characteristic cut-off energy for detection (which can be lower than the aforementioned 6 MeV depending on application and needed measurement accuracy) that can separate SF neutrons from the other neutron signatures.

Pursuant to another aspect of an embodiment of the present invention, it has also been determined that the noble gas, e.g. He-4, detector system is substantially insensitive to gamma radiation in this region of interest. Here, the high levels of gamma radiation coming from MOX fuel rods is a source of signal contamination (e.g., noise) to other detection methodologies such as, but not limited to, those based on liquid scintillators.

The noble gas, e.g. He-4, detection device and method according to an embodiment of the present invention provides a fission neutron detection approach with very limited sources of signal contamination (e.g., noise).

Figure 2:
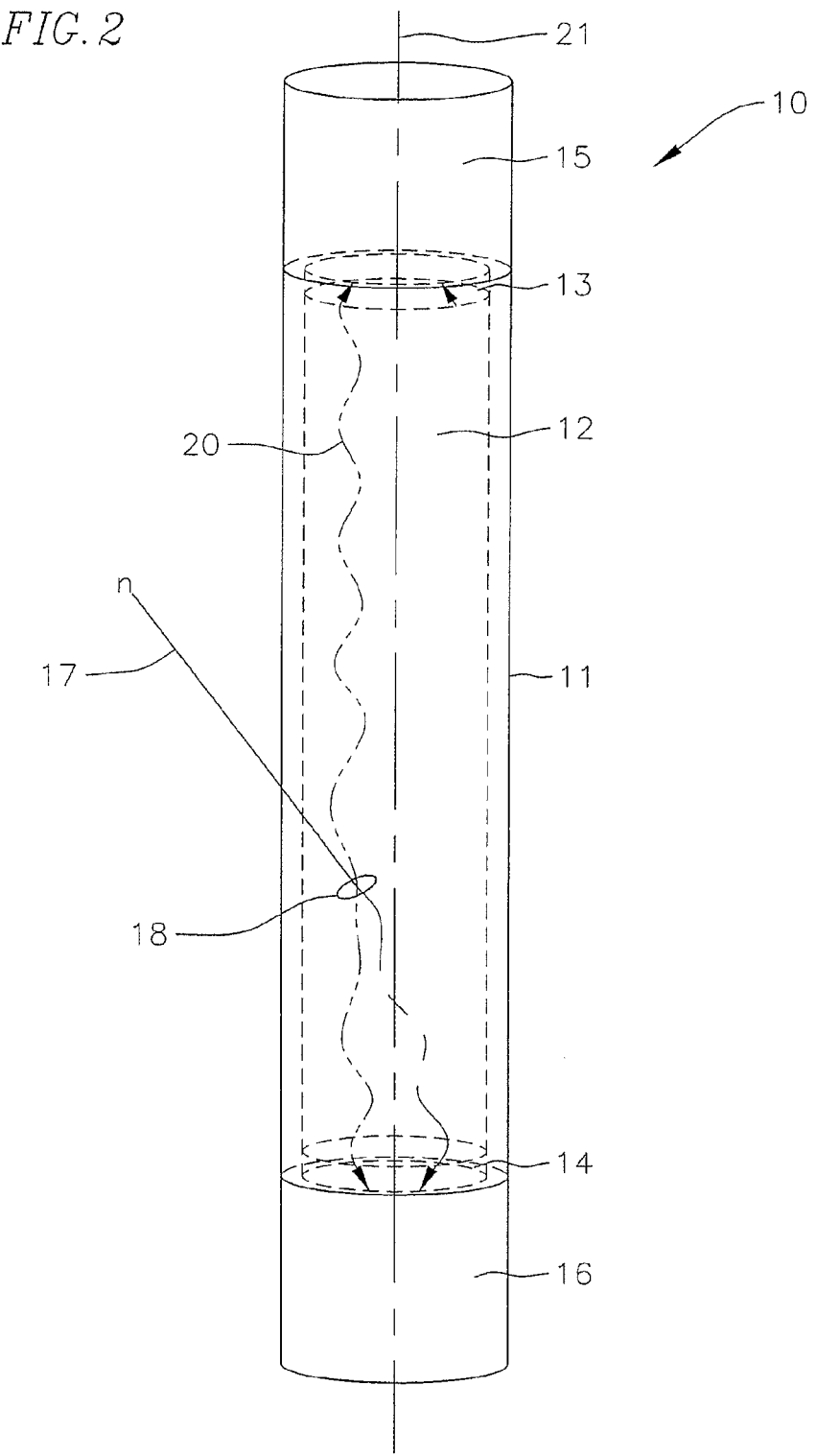
FIG. 2 shows a single radiation detector with incoming neutron radiation depositing energy in the detector by interaction with a noble gas, e.g. Helium, in the measuring volume.

FIG. 2 shows a single radiation detector that may be utilized in a detection system according to an embodiment of the present invention. The radiation detector 10 includes a cylindrical, elongated container 11, which extends along a longitudinal axis 21 and contains a measuring volume 12 of a noble gas, such as Helium gas. In the context of the present invention, Helium is typically in the form of a colorless, odorless, tasteless, non-toxic, inert, monatomic gas. However, Helium can also be in solid and/or liquid phases. In addition, there are eight known isotopes of Helium, but only He-3 (Helium-3) and He-4 (Helium-4) are stable. In the Earth's atmosphere, there is one He-3 atom for every million He-4 atoms. However, unlike most elements, Helium's isotopic abundance varies greatly by origin, due to the different formation processes. That is, He-3 is much more abundant in stars, as a product of nuclear fusion. Thus in the interstellar medium, the proportion of He-3 to He-4 is around 100 times higher than on Earth. Here, in the context of the present invention and unless stated otherwise, Helium refers to Helium in the Earth's atmosphere (i.e., natural Helium—which contains mostly He-4). Also, in one embodiment, the Helium in the measuring volume 12 can in the liquid state or in the pressurized gas phase state. In one embodiment, Helium in the measuring volume 12 is pressurized up to 200 bar, but the present invention is not thereby limited and for high gamma rate environments, the pressures may be lower for example. Wall thickness is mainly derived from pressure. Here, as envisioned, the detector should work well if the He-4 is suitably pure, but the present invention is not thereby limited. In one embodiment, other noble gases such as Argon can be used in the measuring volume 12 and can be pressurized up to 200 bar or in a liquid state.

In operation, an incident ray 17, such as a high energy neutron, deposits energy in the radiation detector 10. An energy-dependent part of the deposited energy is converted by an interaction 18 with the noble gas, e.g. Helium, into eximer photons 20. Some of these eximer photons 20 arrive at two photon counters 15, 16 or other comparable photon detectors arranged at opposite ends of the measuring volume 12. The photon counters 15, 16 are optically coupled to the measuring volume 12 via light guides 13, 14. The eximer photons 20 may possibly be shifted in wavelength and reflected at the wall of the container 11. The photon counter closer to the point of the interaction 18 typically detects more photons and at an earlier time than the photon counter more distant.

Here, the measuring volume 12 with the noble gas, e.g. Helium, is confined in an elongated container or vessel 11 terminated by view ports in the form of light guides 13, 14 made of an optically transparent material such as quartz glass. Each of these light guides 13, 14 is optically coupled to a photon counting device or photon counter 15, 16, for instance a photomultiplier tube (PMT). The short wavelength (VUV or below) noble gas eximer light, to which most materials are opaque, can be reflected off the container walls, until it reaches one of the light guides 13, 14. Else, or additionally, the container walls may be coated with a wavelength shifting coating, such as Tetraphenyl Butadiene (TPB) or P-Terphenyl, or a mixture containing one or both components, with the purpose to down-convert the eximer photons 20 to a more practical wavelength, for instance 420 nm. Such down-converted photons can easily be reflected until they reach the terminating light guide 13 or 14. The face of the light guide 13, 14 exposed to the measuring or detection volume 12 can also be coated with a wavelength shifting coating that is transparent to its own emission wavelength. This may be achieved by dip coating with a polystyrene-TPB-chloroform solution. The light guides 13, 14 guide photons to the respective photon counter 15, 16, either by total internal reflection or due to a reflective coating or wrapping.

Furthermore, the photon counters, 15, 16, according to another embodiment of the invention can be fully or partially enclosed by the container 11 to be inside the measuring volume 12, eliminating the need for light guides 13 and 14. Also, the photon counters may be solid state devices (e.g., avalanche photodiodes) sensitive to the noble gas eximer light and/or a shifted wavelength of this light. The photon counters are connected to the detector electronics by some form of feed-through. In this embodiment, high detection yields can be achieved by reducing or eliminating losses arising from light guides, as well as through convenient photon detector placement and area coverage.

Figure 3:
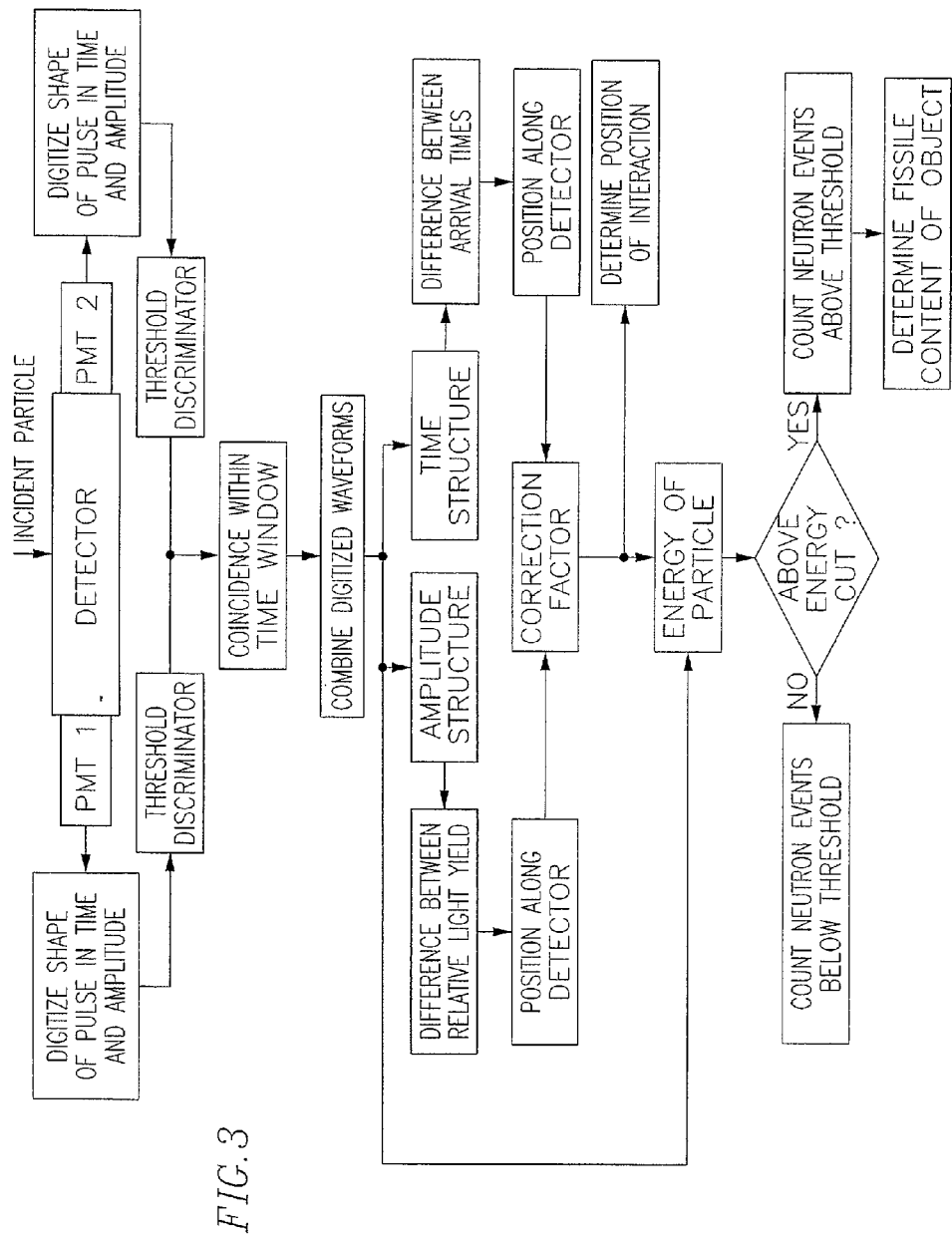
FIG. 3 shows an operational diagram of a radiation detector for fissile content measurement in an embodiment of the present invention.

FIG. 3 shows a detailed operational diagram of a radiation detector for fissile content inspection of radioactive material (e.g., MOX fuel) according to an embodiment of the present invention. In other embodiments of the invention, a detector with a different geometry may be used, not requiring a position correction factor. Other embodiments may carry out the signal processing in the analog domain without digitization, have a different sensor process (such as for example with devices similar to proportional counters), or use the output variables for further processing to draw conclusions regarding the isotopic composition of the sample.

Referring to FIG. 3, an incident particle, such as a neutron, arising from an object of interest, deposits energy in a radiation detector, e.g., a He-4 detector. An energy-dependent part of the deposited energy is converted by an interaction with the noble gas, e.g. Helium, in the radiation detector into eximer photons. The photon counters (PMT 1, PMT 2) either directly or indirectly detect and count the eximer photons. The information on the detected photons in the photon counters is recorded and the shape of pulse in time and amplitude is digitized. These digitized wave forms are each filtered by a threshold discriminator, e.g., a filter configured to eliminate very low amplitude pulses that are characteristic of noise. The digitized waveforms are then provided to a coincidence filter to see if the two wave forms are within a time window characteristic of the physical length of the detector. This filtering process also eliminates many sources of noise.

After these amplitude and coincidence filters, the digitized waveforms are combined and analyzed for arrival time differences and amplitude differences from which a position along the detector is derived. From this position a correction factor is determined for the combined amplitude of the pulses. The combined and corrected amplitude is used to determine the energy of the incident particle. This position determination is also of use in tracing the point of origin of the interacting neutron.

A filter is then used to determine of the energy of the particle is above a predetermined threshold characteristic of neutrons arising solely from the fission process. Neutrons above this threshold are counted and this count is used to determine the fissile content of the object of interest. In addition neutrons below this threshold are counted.

Figure 4:
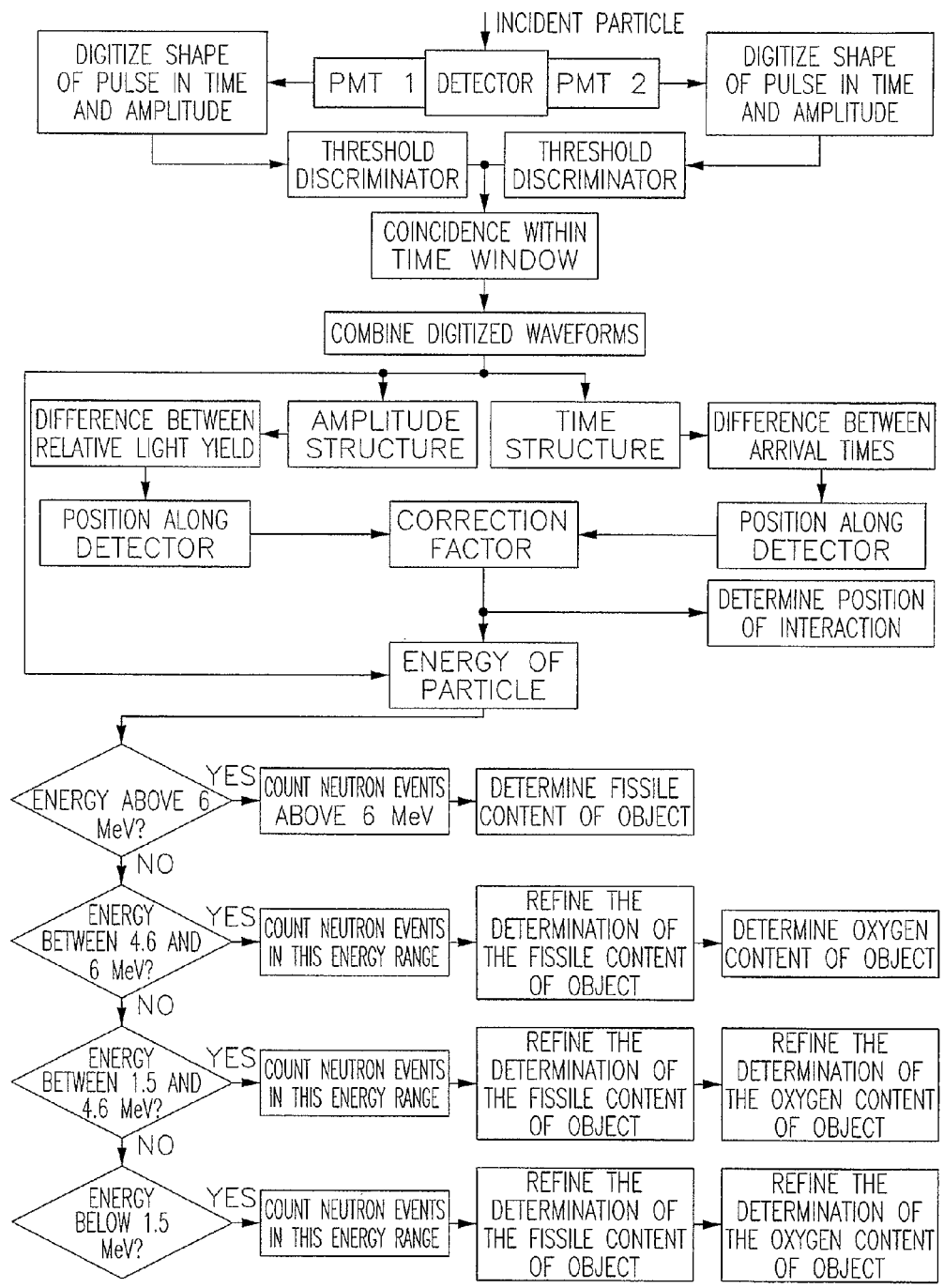
FIG. 4 shows an operational diagram of a radiation detector for fissile content measurement using multiple energy thresholds or windows in an embodiment of this invention.

FIG. 4 shows a detailed operational diagram of a radiation detector for fissile content inspection of radioactive material (e.g., MOX fuel) according to another embodiment of the present invention.

The embodiment shown in FIG. 4 uses multiple energy thresholds and windows to provide increased accuracy and additional information about the fuel rods. Reactor fuel rods produce a spectrum of neutrons whose shape depends on the fissile material present and the material matrix in which this fissile material is embedded. For rods whose content is the fissile material in metallic form, the shape of the spectrum is the well know Watt spectrum. For rods whose content includes the oxides of the fissile material, the spectrum is a sum of the Watt spectrum and the spectrum of neutrons produced by alpha particle reactions with the isotopes of Oxygen that are now present. Additionally the spectrum will be modified by the elastic scattering of the neutrons with the Oxygen. Using multiple energy thresholds and windows allows for a measure not only of the fissile content of the reactor rod but also a measure of the oxide material matrix in which the fissile material is present. These measures create new opportunities for determining reactor rod performance as well as new opportunities for limiting the proliferation of nuclear materials.

Above about 6 MeV the only source of neutrons is from the fissile material as the alpha reactions with the isotopes of Oxygen are kinematically limited to producing neutrons of energies lower than 6 MeV. Measuring the number of neutrons emitted by a sample above 6 MeV is a measure of the fissile content of the reactor rod.

Figure 5:
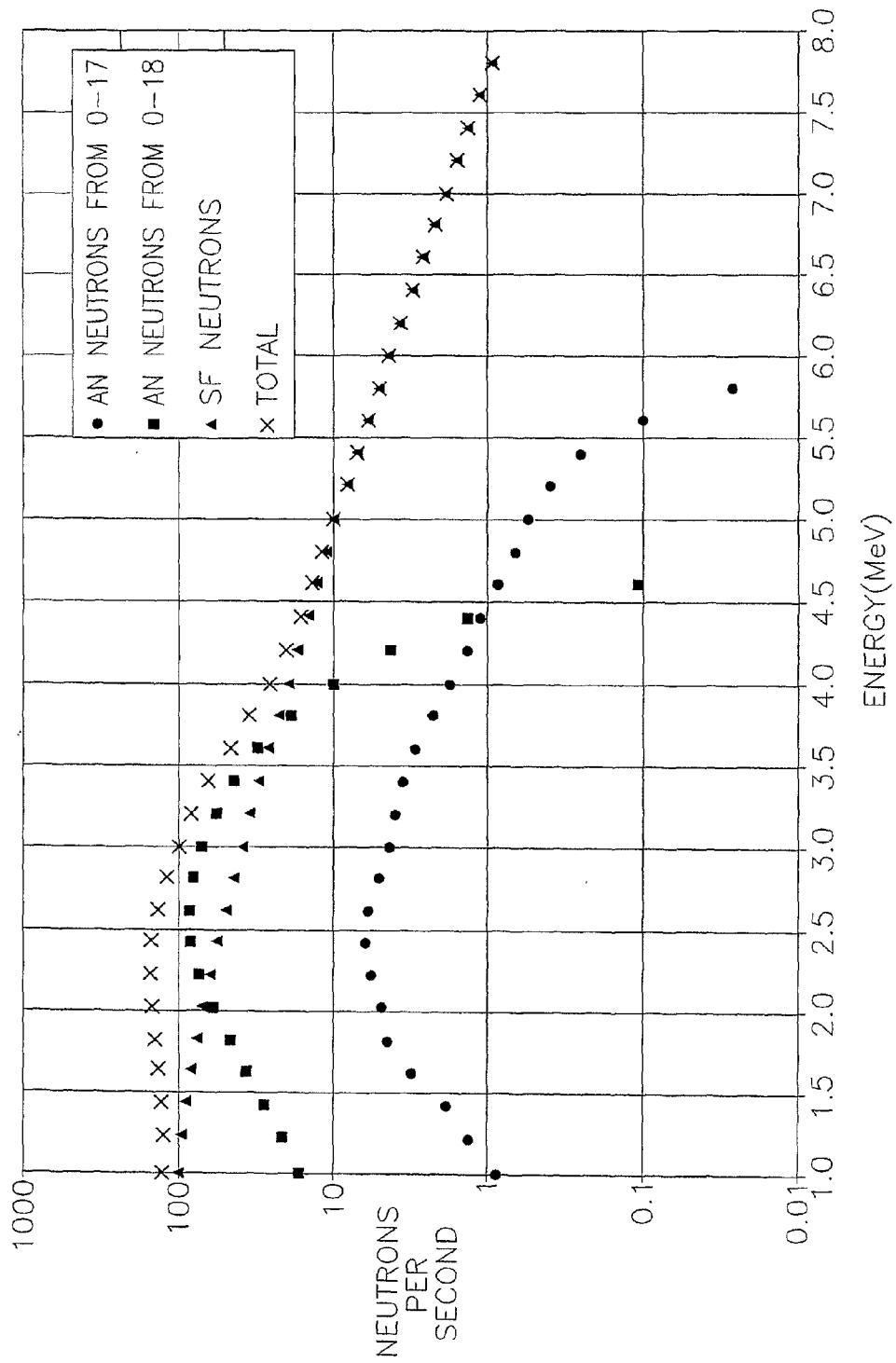
FIG. 5 shows computer simulation results of neutron energy spectrum from alpha interactions on the Oxygen isotopes in the same representative composition of mixed Oxide (MOX) reactor fuel as FIG. 1. Neutrons from (alpha, n) reactions on O-17 are indicated as AN NEUTRONS FROM O-17 in FIG. 5, and neutrons from (alpha,n) reactions on O-18 are indicated as AN NEUTRONS FROM O-18 in FIG. 5. Due to kinematics there is an energy cutoff for the neutrons from the AN O-17 interactions at 5.96 MeV and for AN O-18 interactions at 4.62 MeV. Also shown in the figure is the spectrum of spontaneous fission neutrons coming from the fissile material in the representative sample.

Referring now also to FIG. 5, between about 4.6 MeV and 6 MeV there are two sources of neutrons—the Watt spectrum and the neutrons from the alpha reactions with an isotope of Oxygen, O-17. Because this Oxygen isotope is not very abundant and because the probability of an alpha reactions with this isotope is small, neutrons in this energy range will be dominated by the Watt spectrum by an order of magnitude or more as shown in the figure. Additionally the neutron spectrum from alpha reactions with O-17 is well known. Because the shape of the Watt spectrum is well known as well, an expected value for the fissile neutrons in the energy range 4.6 to 6 MeV can be made using the number of neutrons measured with energies above 6 MeV. Deviations from this expected value is a measure of the oxygen content of the rod.

Between about 1.5 MeV and 4.6 MeV, the neutrons arise from the Watt spectrum as well as alpha reactions with two isotopes of Oxygen, O-17 and O-18. Again, because the shape of the Watt spectrum is very well known and additionally the neutron spectrum from the alpha reactions with these oxygen isotopes is well known, an expected value for the fissile neutrons in the energy range 1.5 to 4.6 MeV can be made using the number of neutrons measured above 6 MeV and the number of neutrons measured between 4.6 to 6 MeV. Deviations from this expected value is a measure of the oxygen content of the rod and allows for a better estimate of the fissile content of the rod as well.

Below about 1.5 MeV the neutron spectrum is dominated by the Watt spectrum. Using the other energy range measurements allows for a more refined determination of the oxygen and fissile content of the rods.

The use of energy ranges as described in FIG. 4 allows for a measure not only of the fissile content of the reactor rod but also a measure of the oxide material matrix in which the fissile material is present. These measures create new opportunities for determining reactor rod performance as well as new opportunities for limiting the proliferation of nuclear materials.

Figure 6:
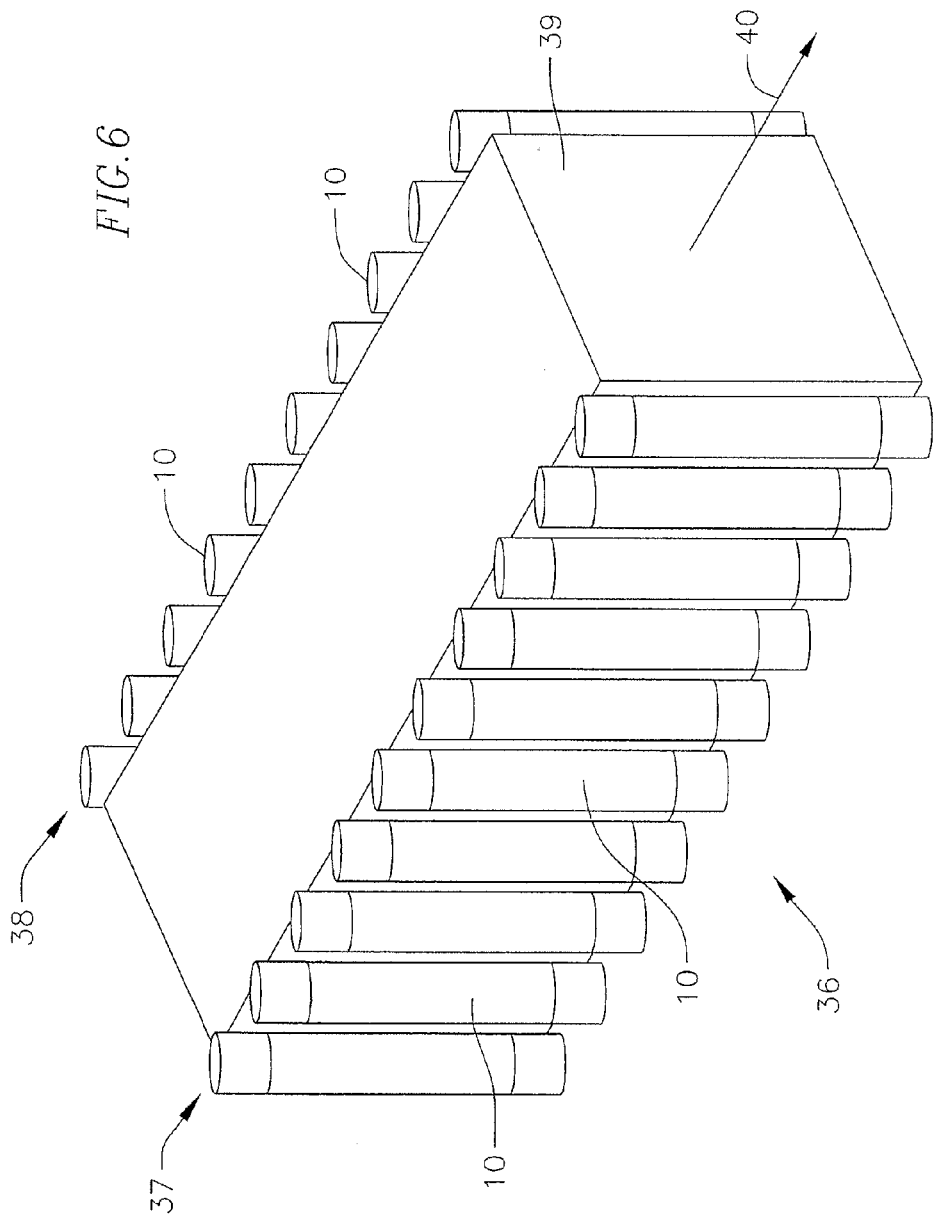
FIG. 6 shows how several radiation detectors arranged in detector rows and operated together in a monitoring system.

FIG. 6 shows an embodiment, wherein several identical radiation detectors 10 are configured in and operated together as a pair of detector rows. In more detail, FIG. 6 shows an embodiment of the invention as a monitoring system 36, wherein the radiation detectors 10 are arranged in detector rows 37, 38 to form the monitoring system, the detector rows 37, 38 extending on opposite sides along the volume of a sample 39 to be tested, e.g. a fuel rod assembly. Here, the central axis of this sample 39 is indicated as 40.

Figure 7:
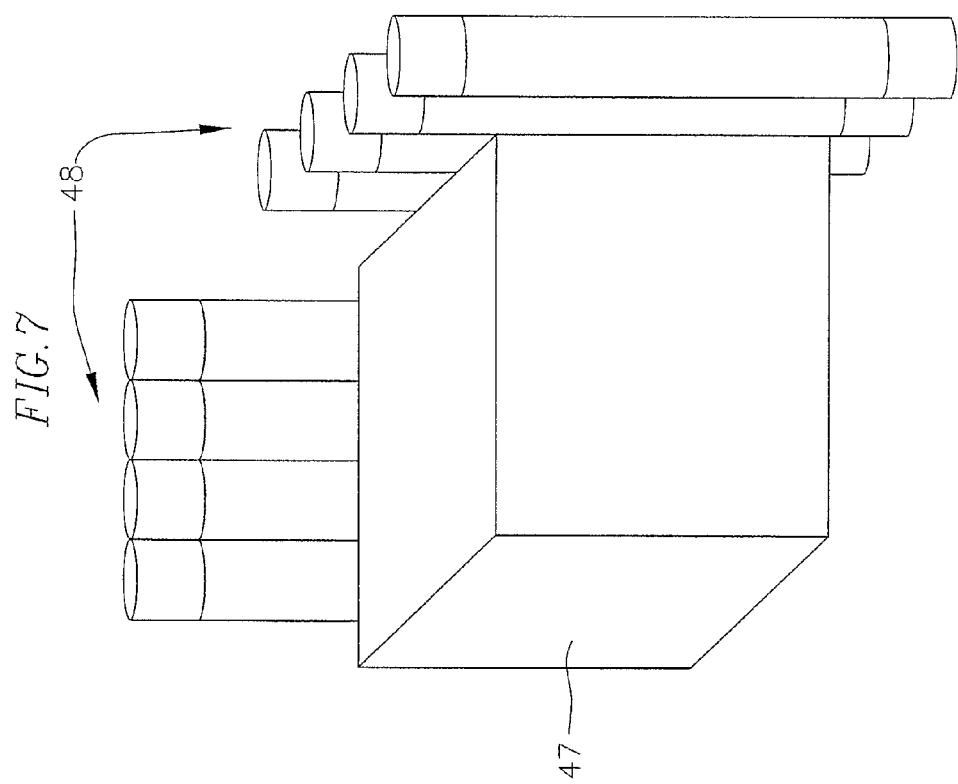
FIG. 7 shows radiation detectors in another detector arrangement.

FIG. 7 shows a detector arrangement 48 according to another embodiment of the invention. Here, in FIG. 7, the volume 47 may be defined by a glove box containing radiation source. The radiation source may be provided to the glove box as a part of a step in a fuel production process line (e.g., a fissile or MOX reactor fuel production process line).

Although the detector arrangements described so far include only a group of radiation detectors configured on two sides of a radiation source, other detector arrangements may be advantageous, where various radiation detectors are oriented in different sides or directions. For example, one or more detector planes may be placed on top, below, or on the sides of a glove box containing a radiation source. Multiple planes on a given side may also be advantageous.

In one embodiment of the present invention, if the access to a radiation source (sample) is limited due to space constraints. One or more radiation detectors (e.g., one or more detectors 10) are inserted from direction of easiest access.

Figure 8:
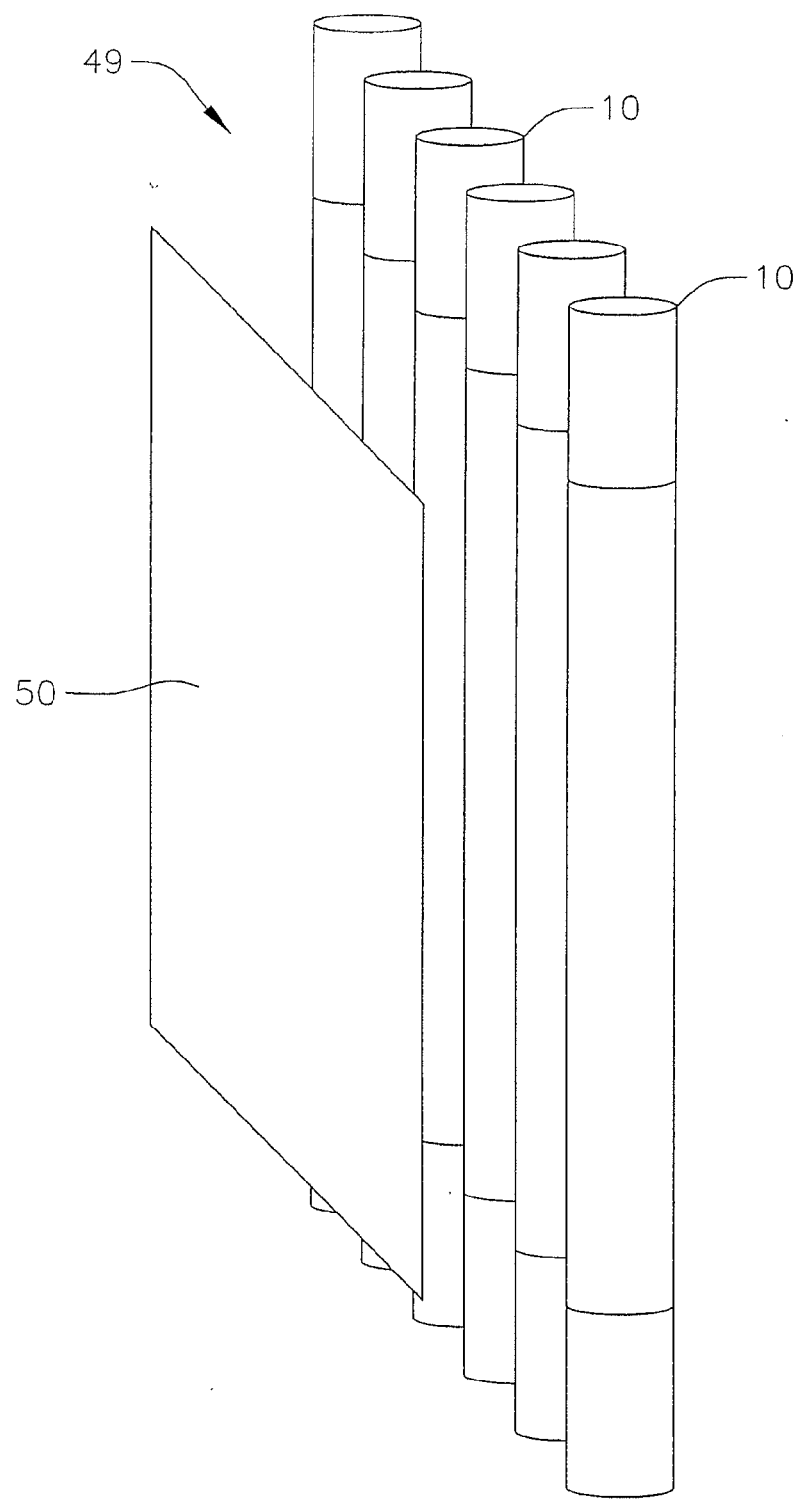
FIG. 8 shows a detector arrangement with a single row of radiation detectors as might be used for a glove box, hot cell or other planar system.

FIG. 8 shows a detector arrangement 49 according to an embodiment of the present invention, wherein a row of radiation detectors 10 is arranged only on one side of a radiation source 50.

Figure 9:
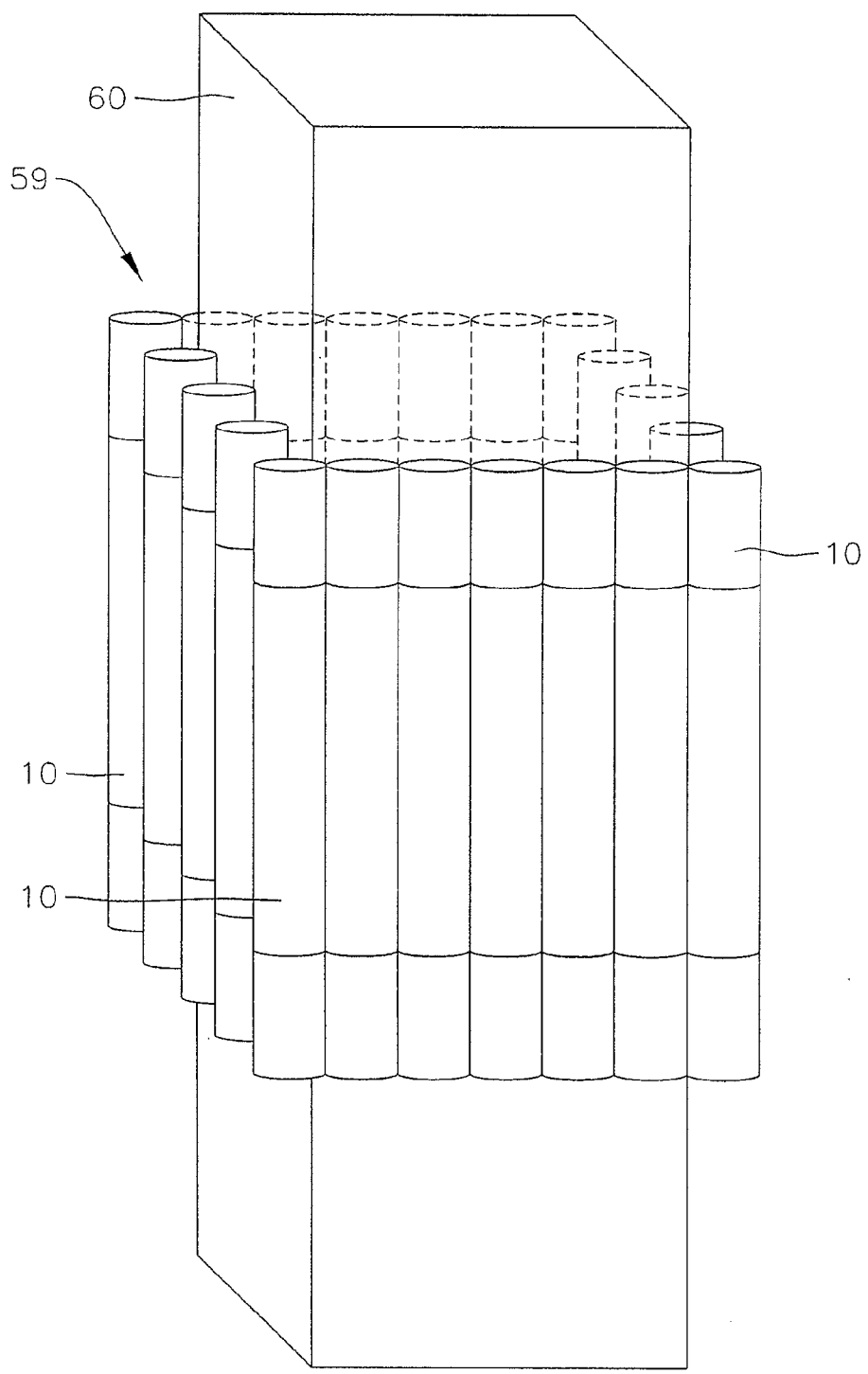
FIG. 9 shows a detector arrangement with a collar of radiation detectors to fully or partially encompass a radiation source.

FIG. 9 shows a detector arrangement 59 according to another embodiment of the invention where four rows of radiation detectors 10 are arranged on four sides of a radiation source (sample) 60 to, for example surround the radiation source 60. That is, the radiation detectors are arranged as part of a detector collar to fully or partially encompass the radiation source 60. The radiation source or sample 60 may be elongated—line of a fuel bundle—and may be pulled through the collar in an axial direction of the detector arrangement 59. Here, in one embodiment, the number of detectors 10 configured in these four rows can be from 20 to 28 detectors, but the present invention is not thereby limited. Moreover, the number of detectors in each row of the detector arrangement may be the same or different, and the present invention is not thereby limited.

The method and system according to an embodiment of the present invention may furthermore be used for verifying of the contents of a container or for identifying a container itself, i.e. for radiation identification and verification of casks (containers) for spent nuclear fuel (see for example K. P. Ziock et al., Radiation Imaging of Dry-Storage Casks for Spent Nuclear Fuel, IEEE Nuclear Science Symposium Conference Record, N30-1, p. 1163-1167 (2005)). Such a container can be characterized by a radiation "fingerprint" or by the location and arrangement of fuel rods or assemblies within the cask, which may be used to monitor the location and/or transport of the casks.

Figure 10:
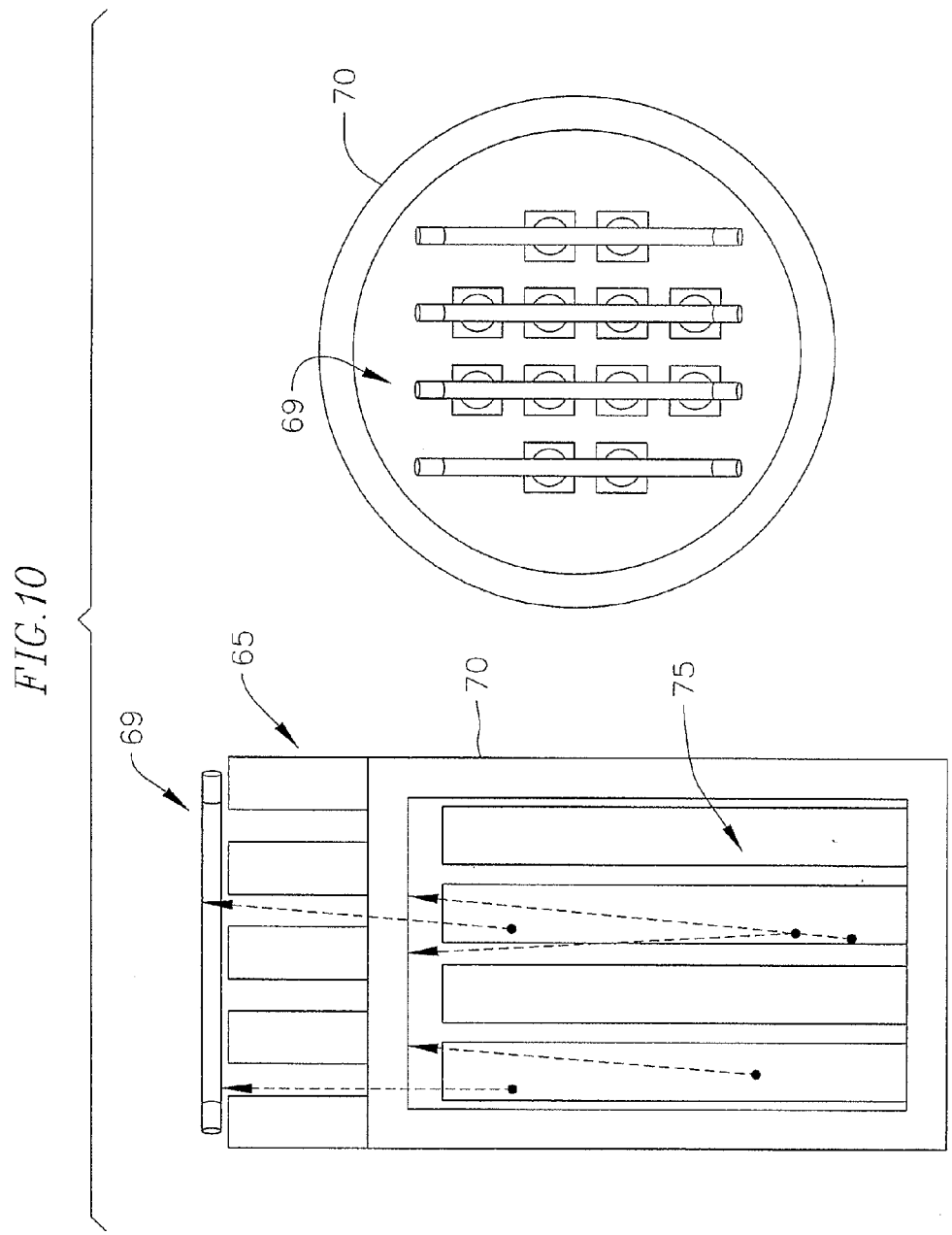
FIG. 10 shows a detector arrangement placed on a dry cask.

FIG. 10 shows a detector arrangement 69 that is placed on a dry cask 70 according to an embodiment of the invention. Here, the detector arrangement 69 is placed on the dry cask 70 with optional collimators 65 and positioned to facilitate independent measurement of emissions from each fuel bundle. The detector tubes are placed transverse to the collimator guides so that the position measurement of the neutron interaction in the detector can be used to determine if a neutron source is present at that collimator position. Here, the detector arrangement 69 may be utilized to perform an accountability measurement on top of the dry cask 70. The detector arrangement 69 can be used to detect if spent fuel assemblies 75 have covertly been removed (e.g., four of the originally 16 as suggested in the figure).

As further envisioned, one or more detectors (e.g., one or more detectors 10) according to embodiments of the present invention can be placed in proximity to a spent fuel assembly or single fuel pin, for example underwater in a cool-down pond. Also, one or more of these detectors may be used to detect or analyze vitrified waste.

Figure 11:
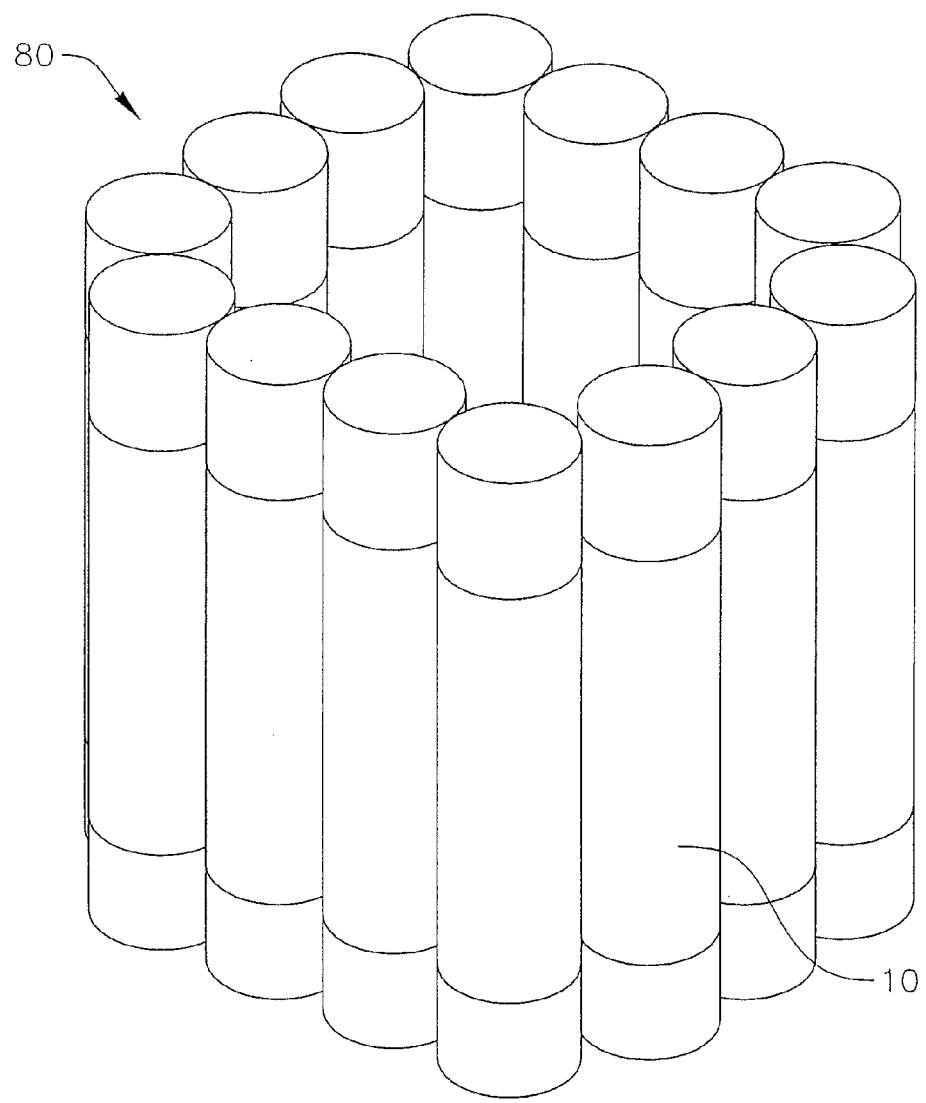
FIG. 11 shows a detector arrangement as a well counter.

FIG. 11 shows a detector arrangement 80 as a well counter. The detectors form a receptacle into which a sample can be placed, such that the detectors cover the full solid angle into which radiation is emitted by the sample. Such an arrangement allows measurements with high precision, as the large solid angle and the detection efficiency are well known. The geometry of such a well counter may be cylindrical, spherical, or box-shaped.

Figure 12:
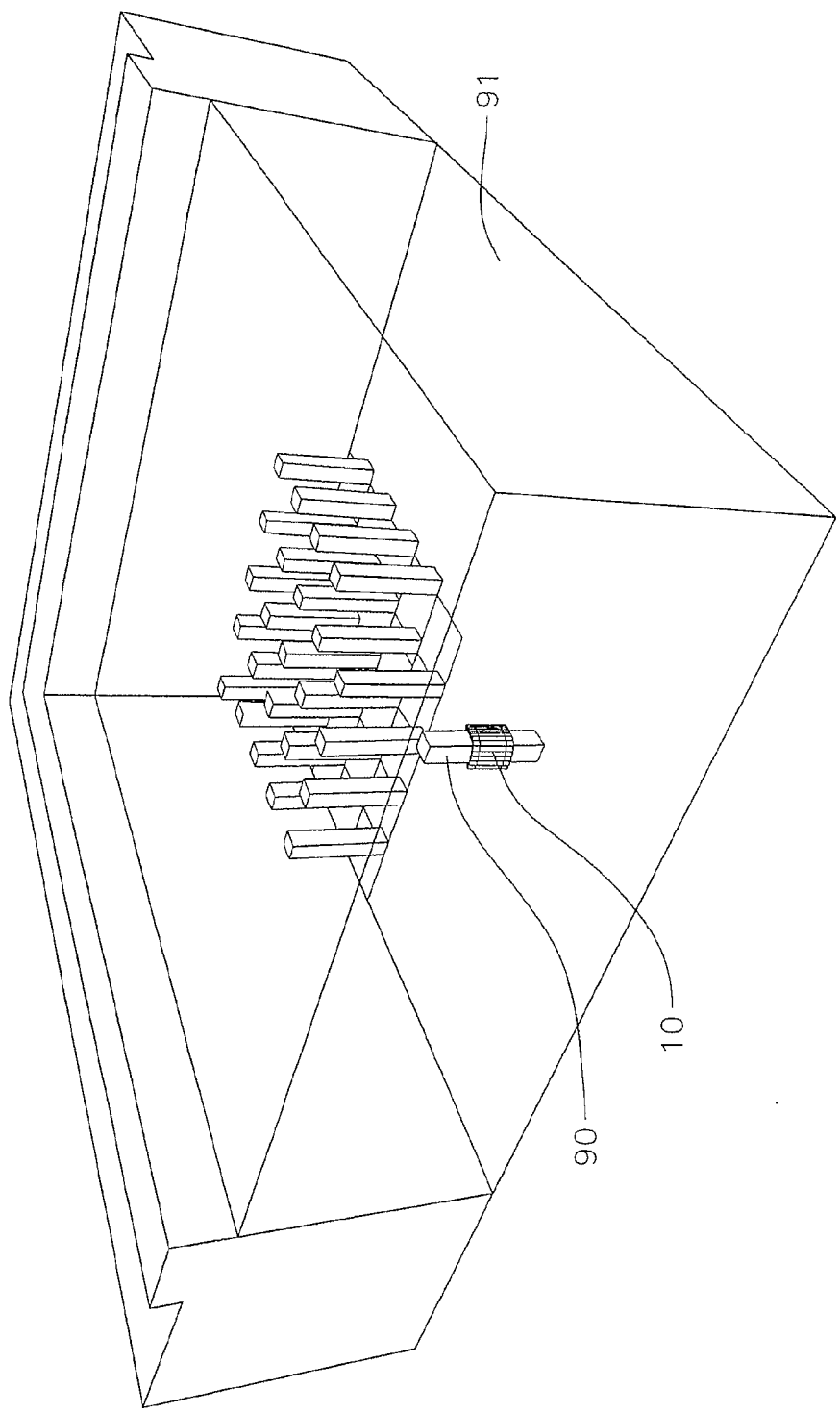
FIG. 12 shows a detector arrangement as detector for submerged measurements in cool-down pool.

FIG. 12 shows a detector arrangement as detector for submerged measurements in cool-down pool, one or more detectors 10 according to embodiments of the present invention is placed in proximity to a fuel assembly (fuel bundle) 90 submerged in a cool-down pool 91.

Figure 13:
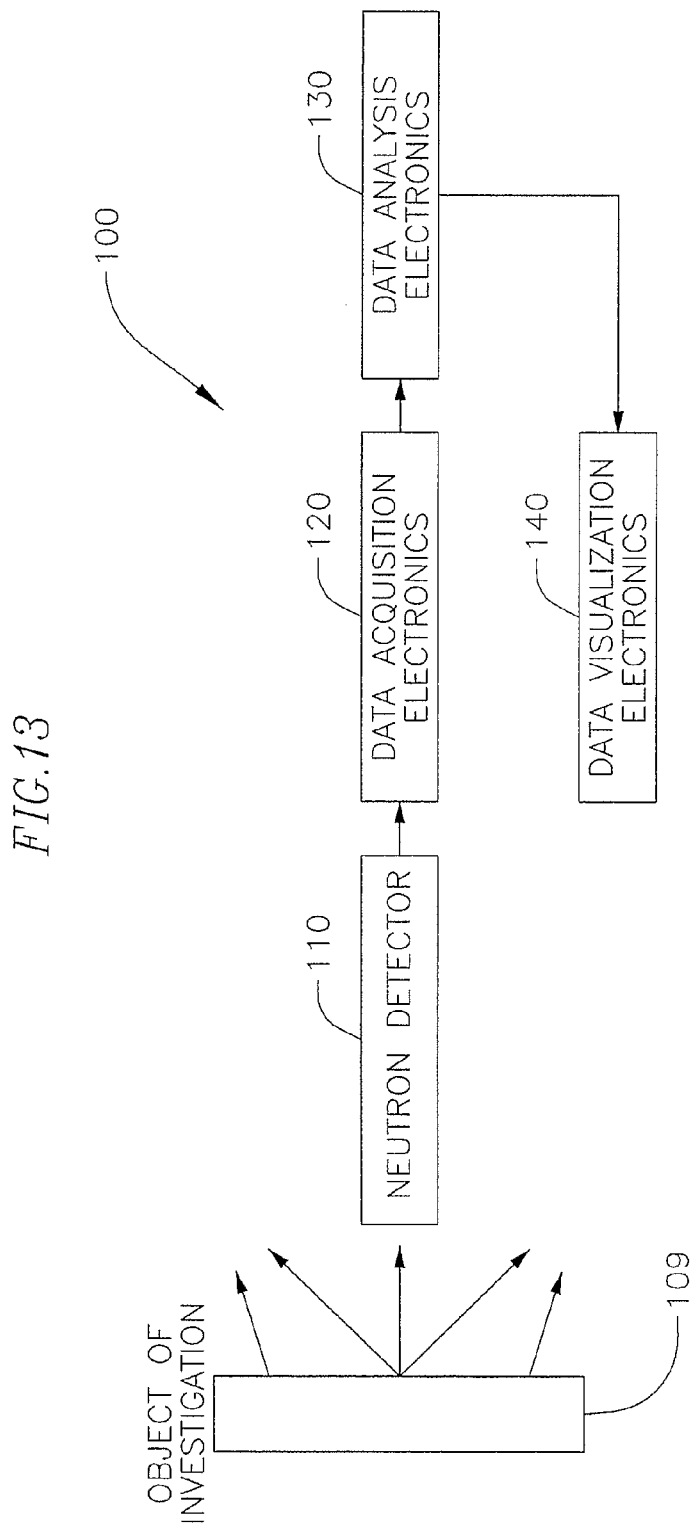
FIG. 13 shows a system used to measure the energy spectrum of neutrons emitted from an object and analyzes that spectrum to be revealing of the fissile content of the object.

FIG. 13 shows a system 100 used to measure the energy spectrum of neutrons emitted from an object (sample) 109 and analyzes that spectrum to be revealing of the fissile content of the object 109. Additionally this system 100 can be used to measure the spatial source of origin of neutrons emitted from the object 109 and analyze that measurement to be revealing of the neutron emitting geometry of the object 109. In FIG. 13, the neutron emitting object 109 of investigation is shown. The system 100 is composed of a detector 110 (e.g., the detector 10) or group of detectors according to embodiments of the present invention connected to data acquisition electronics 120, data analysis electronics 130, and data visualization electronics 140. Here, in one embodiment, the data acquisition electronics 120, the data analysis electronics 130, and the data visualization electronics 140 may a part of a data acquisition (DAQ) Processor and/or an application-specific integrated circuit (ASIC) processor.

Figure 14:
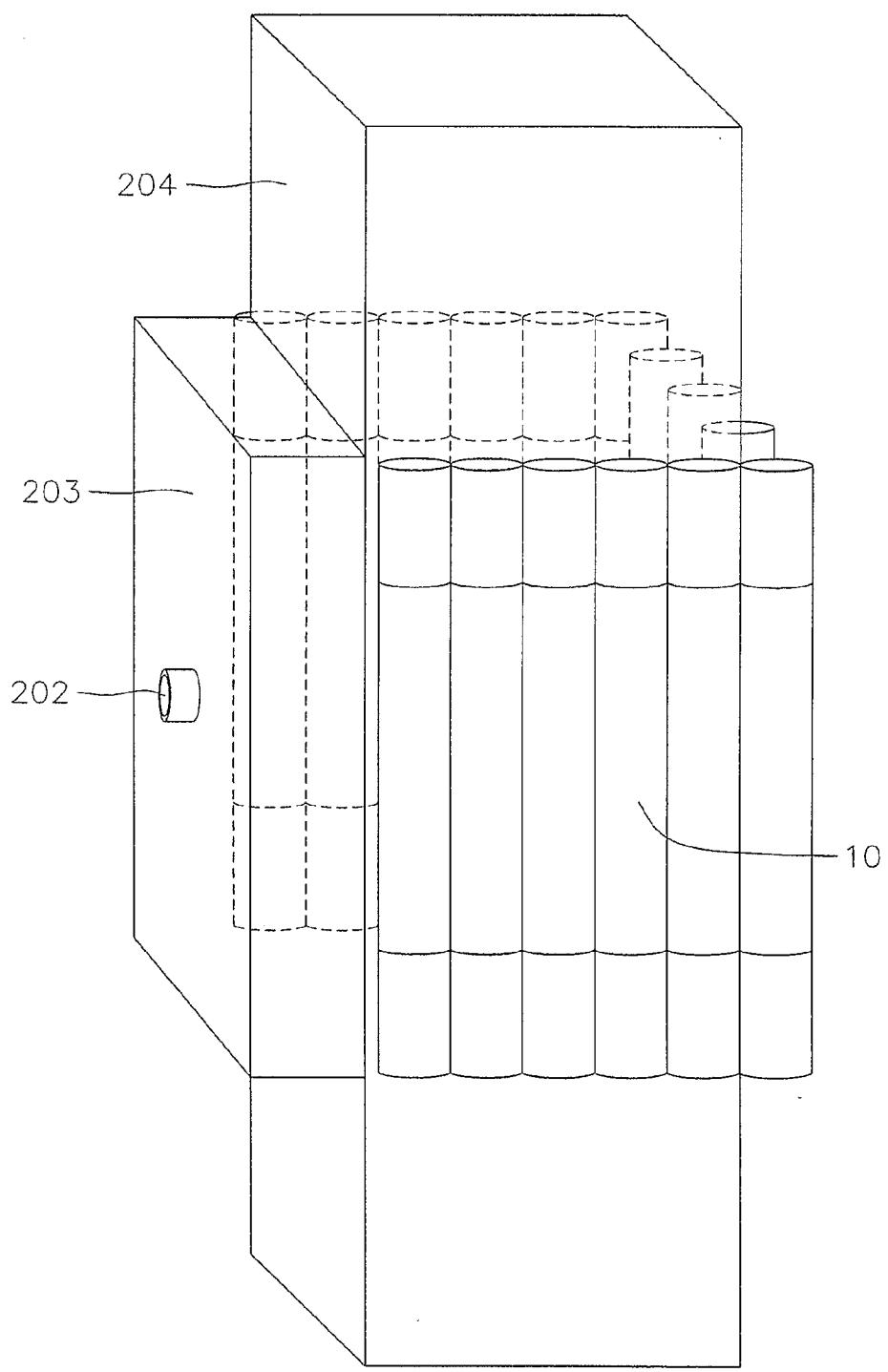
FIG. 14 shows a detector arrangement as a collar used together with an additional radiation source to induce fission in fissile materials with a low spontaneous fission probability.

FIG. 14 shows an embodiment of the invention involves using an external or additional radiation source 202 to induce fission in fissile materials such as Uranium with a low spontaneous fission probability. The external radiation source can be a low energy chemical neutron source such as Americium-Lithium, or an electronic neutron generator such as a neutron generator based on deuterium interaction (deuterium-deuterium (DD) generator), where the neutrons emitted by the source are below the cutoffs of the (alpha,n) reaction on Oxygen. An additional moderator 203 can be placed between the source and the inspected object 204, and between the source and the detectors. In a different embodiment, the external radiation source supplies high energy photons capable of inducing photofission in the sample.

It should be appreciated from the above that the various structures and functions described herein may be incorporated into a variety of apparatuses (e.g., a detecting device, a monitoring device, etc.) and implemented in a variety of ways. Different embodiments of the imaging and/or monitoring devices may include a variety of hardware and software processing components. In some embodiments, hardware components such as processors, controllers, state machines and/or logic may be used to implement the described components or circuits. In some embodiments, code such as software or firmware executing on one or more processing devices may be used to implement one or more of the described operations or components.

In view of the foregoing, some embodiments of the invention described herein generally relate to an apparatus and method for utilizing a measure of neutron energy utilizing a filtering scheme to determine the Plutonium content of nuclear material such MOX reactor rods.

In a device according to an embodiment of the present invention, the fissile content (e.g., the Plutonium content) is measured as a function of position within the sample, for example by using the detector's event localization capability.

In one embodiment, one or more detectors are used to measure the Plutonium or fissile material content of a sample in situations where access is restricted to a small solid.

In one embodiment, an array of detectors mounted on top of a dry cask is used to verify the presence of the declared content.

In one embodiment, one or more detectors are used to measure the Plutonium or fissile material content in highly radioactive materials such as spent fuel or vitrified waste, for example submerged in a cool down pond or inside a hot cell, wherein the high intensity gamma radiation is rejected by the detector.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system for analyzing a sample comprising:
   a Helium excimer detector including He-4 isotope for detecting fast neutrons generated by an interaction of the sample with the He-4 isotope of the Helium excimer detector;
   a photon counter for counting said fast photons;
   a processor for digitizing a shape of a pulse of the recorded photons in the photon counter in time and in amplitude to generate two digitized waveforms, respectively, wherein the processor is configured to: combine the digitized waveforms, analyze the combined digitized waveforms for arrival time differences and amplitude differences, derive a position of said interaction along the Helium excimer detector from the arrival time differences and amplitude differences, determine a correction factor for the combined amplitude of the waveforms from the derived position, apply the correction factor to the combined amplitude to obtain a corrected amplitude, and determine an energy of the fast neutrons emitted by the sample from the combined amplitude and the corrected amplitude; and
   a classifier for classifying said detected fast neutrons as having a high likelihood of originating in a nuclear fission process by counting detected neutrons that have an energy higher than a predetermined threshold.

2. The system of claim 1, wherein the processor is one of a data acquisition (DAQ) Processor and an application-specific integrated circuit (ASIC) processor.

3. The system of claim 1, wherein the classifier comprises a discriminator configured to discriminate between the detected fast neutrons emitted from the nuclear fission process and detected fast neutrons emitted from an (alpha,n) reaction by utilizing one or more energy thresholds or windows in accordance with energy cutoffs of (alpha,n) spectra.

4. The system of claim 1, wherein the sample is a nuclear fuel bundle, and an array of detectors surrounds the nuclear fuel bundle to measure Plutonium or fissile material content, and wherein the fuel bundle is moved through the array of detectors arranged to have a collar geometry along an axis of the fuel bundle.

5. The system of claim 1, wherein the detector comprises an array of detectors placed on top, on a side, or below a glove box or hot cell to measure Plutonium or fissile material content of the sample.

* * * * *